United States Patent
Yun et al.

(10) Patent No.: US 12,018,524 B2
(45) Date of Patent: Jun. 25, 2024

(54) DOOR CLOSING IMPACT ABSORBER AND DOOR MECHANISM PROVIDED WITH THE SAME

(71) Applicants: Hyundai Motor Company, Seoul (KR); Kia Corporation, Seoul (KR)

(72) Inventors: Hyungin Yun, Seoul (KR); Chungsik Yim, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/980,344

(22) Filed: Nov. 3, 2022

(65) Prior Publication Data

US 2024/0151087 A1 May 9, 2024

(30) Foreign Application Priority Data

Dec. 8, 2021 (KR) .................. 10-2021-0174936

(51) Int. Cl.
*E05F 5/02* (2006.01)
(52) U.S. Cl.
CPC .................. *E05F 5/025* (2013.01)
(58) Field of Classification Search
CPC .. E05F 5/025; E05F 5/02; E05F 5/022; E05D 2015/1055; E05D 15/58
See application file for complete search history.

(56) References Cited

U.S. PATENT DOCUMENTS

| | | | | |
|---|---|---|---|---|
| 615,034 | A * | 11/1898 | Merrill | E05F 5/025 16/85 |
| 1,022,651 | A * | 4/1912 | Bedard | E05F 5/025 16/85 |
| 1,329,313 | A * | 1/1920 | Seabury | E05F 5/025 292/74 |
| 3,334,375 | A * | 8/1967 | Hubbard | E06B 3/924 16/97 |
| 4,464,863 | A * | 8/1984 | Chikaraishi | E05D 15/1047 49/213 |
| 4,704,819 | A * | 11/1987 | Tutikawa | E05D 15/1042 49/213 |
| 5,895,089 | A * | 4/1999 | Singh | E05F 7/04 49/213 |
| 5,934,022 | A * | 8/1999 | Faubert | E05F 5/003 49/360 |
| 6,286,890 | B1 * | 9/2001 | Faubert | E05D 15/1047 16/86 A |
| 6,408,483 | B1 * | 6/2002 | Salice | E05F 5/02 16/85 |
| 6,550,848 | B2 * | 4/2003 | Kleemann | E05D 15/1047 49/141 |
| 6,711,856 | B1 * | 3/2004 | Hoffman | E05F 1/105 49/386 |
| 6,779,832 | B2 * | 8/2004 | D'Assumcao | E05D 15/0652 296/105 |

(Continued)

*Primary Examiner* — Jeffrey O'Brien
(74) *Attorney, Agent, or Firm* — MORGAN, LEWIS & BOCKIUS LLP

(57) ABSTRACT

A door closing impact absorber apparatus includes a first body, a second body coupled to the first body, wherein the first body and the second body are relatively movable therebetween, and an elastic portion disposed between the first body and the second body to support elastically the first body and the second body.

8 Claims, 10 Drawing Sheets

(56) References Cited

U.S. PATENT DOCUMENTS

| | | | | |
|---|---|---|---|---|
| 7,032,271 B2* | 4/2006 | Lin | ............ | E05F 5/08 |
| | | | | 16/86 B |
| 7,076,834 B2* | 7/2006 | Li | ............ | E05F 5/02 |
| | | | | 16/86 A |
| 7,192,105 B2* | 3/2007 | Jung | ............ | E05F 5/02 |
| | | | | 312/405 |
| 7,438,349 B2* | 10/2008 | Jo | ............ | B60J 5/0487 |
| | | | | 296/190.11 |
| 7,610,718 B2* | 11/2009 | Kopish | ............ | E05D 15/1042 |
| | | | | 49/211 |
| 8,007,028 B2* | 8/2011 | Pencak | ............ | E05F 5/06 |
| | | | | 296/155 |
| 8,567,126 B2* | 10/2013 | Hozumi | ............ | B60J 5/06 |
| | | | | 49/143 |
| 8,651,597 B2* | 2/2014 | Kimura | ............ | E05F 3/00 |
| | | | | 312/319.1 |
| 10,150,444 B1* | 12/2018 | Schwalm | ............ | E05F 5/02 |
| 10,221,605 B2* | 3/2019 | Bortoluzzi | ............ | E05F 5/003 |
| 10,246,923 B2* | 4/2019 | Bortoluzzi | ............ | E05F 5/02 |
| 10,392,848 B2* | 8/2019 | Bortoluzzi | ............ | E05F 5/003 |
| 10,415,293 B2* | 9/2019 | Tomlinson | ............ | E05F 5/02 |
| 10,450,786 B2* | 10/2019 | Koestler | ............ | E05F 5/022 |
| 11,199,037 B1* | 12/2021 | Murr | ............ | E05D 3/02 |
| 11,447,998 B2* | 9/2022 | Long | ............ | E05F 1/16 |
| 11,472,271 B2* | 10/2022 | Choi | ............ | B60J 5/06 |
| 11,585,137 B2* | 2/2023 | Zindler | ............ | E05F 15/638 |
| 2006/0207057 A1* | 9/2006 | Migli | ............ | F16F 9/064 |
| | | | | 16/85 |
| 2009/0106934 A1* | 4/2009 | Chang | ............ | E05C 17/203 |
| | | | | 16/84 |
| 2017/0159341 A1* | 6/2017 | Cho | ............ | E05F 5/025 |
| 2020/0149331 A1* | 5/2020 | Kiryu | ............ | E05F 1/16 |
| 2020/0308888 A1* | 10/2020 | Smith | ............ | E05F 3/10 |
| 2020/0399944 A1* | 12/2020 | Morioka | ............ | E05F 15/646 |
| 2021/0172236 A1* | 6/2021 | Choi | ............ | E05D 15/48 |
| 2021/0172237 A1* | 6/2021 | Choi | ............ | E05F 15/655 |
| 2021/0179021 A1* | 6/2021 | Battlogg | ............ | G08B 13/19695 |
| 2022/0195773 A1* | 6/2022 | Bettcher, III | ............ | E05D 11/1057 |
| 2023/0175300 A1* | 6/2023 | Yun | ............ | E05F 7/04 |
| | | | | 296/193.01 |
| 2023/0202269 A1* | 6/2023 | Yun | ............ | B60J 5/0479 |
| | | | | 296/146.9 |

\* cited by examiner

DOOR CLOSING IMPACT ABSORBER AND DOOR MECHANISM PROVIDED WITH THE SAME

CROSS-REFERENCE TO RELATED APPLICATION

The present application claims priority to Korean Patent Application No. 10-2021-0174936 filed on Dec. 8, 2021, the entire contents of which is incorporated herein for all purposes by this reference.

BACKGROUND OF THE PRESENT DISCLOSURE

Field of the Present Disclosure

The present disclosure relates to a vehicle body door. More particularly, the present disclosure relates to a door closing impact absorber apparatus and a door mechanism including the same.

Description of Related Art

The vehicle door includes a general door hinged to the vehicle body or pillar, a scissor door (or lambo door) that opens or closes by rotating the door upward, a butterfly door or gull wing door that opens or closes the door upper and outside, a sliding door that opens or closes the door in the longitudinal direction of the vehicle body, a coach door (or suicide door) in which the opening and closing directions of the front and rear doors are opposite and various forms of door are used.

In the case of an opposing door, when the door is closed, the door panel and the weather strip may not completely match. As a result, door shaking may occur, impact between the door and vehicle body may occur, and noise may occur.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door closing impact absorber apparatus configured for absorbing the impact when the opposing door is closed to prevent the shaking of the door, and a door mechanism including the same.

A door closing impact absorber apparatus according to various exemplary embodiments of the present disclosure may include a first body, a second body coupled to the first body, wherein the first body and the second body are relatively movable therebetween, and an elastic portion disposed between the first body and the second body to support elastically the first body and the second body.

The first body may be mounted on a door, and the door closing impact absorber apparatus further includes an impact absorber mounted on one end portion of the second body.

The door closing impact absorber apparatus according to various exemplary embodiments of the present disclosure may include a guide portion mounted on the second body.

The guide portion may include a bearing.

A door mechanism according to various exemplary embodiments of the present disclosure may include the door closing impact absorber apparatus.

The first body may be mounted on a door.

The door mechanism according to various exemplary embodiments of the present disclosure may further include an impact absorber mounted on one end portion of the second body.

The door mechanism according to various exemplary embodiments of the present disclosure may further include a guide portion mounted on the second body.

The guide portion may include a bearing.

The door mechanism according to various exemplary embodiments of the present disclosure may further include a guide rail for guiding the movement of the guide portion.

The guide rail may include a rail gate portion for the guide portion to be inserted or separated therethrough, a rail slope including a predetermined slope for guiding the guide portion in the vehicle body width direction and the vehicle body length direction of the vehicle body, and a sliding portion for guiding the guide portion in the vehicle body length direction thereof.

The guide rail may further include a contact portion formed to protrude to selectively contact with the impact absorber.

The door mechanism according to various exemplary embodiments of the present disclosure may further include a guide rail bracket for mounting the guide rail to the vehicle body.

The door may be an opposing door or an opposing swing door.

The door may be a rear door.

The door closing impact absorber apparatus may be mounted on the lower portion of the door.

According to the door closing impact absorber apparatus and the door mechanism including a same according to various exemplary embodiments of the present disclosure, it is possible to prevent the shaking of the door by absorbing the impact when the opposing door is closed.

According to the door closing impact absorber apparatus and the door mechanism including the same according to various exemplary embodiments of the present disclosure, it is possible to suppress the noise generation by absorbing the impact when the opposing door is closed, so that it is possible to improve the marketability.

Furthermore, the effects which may be obtained or predicted by various exemplary embodiments of the present disclosure will be included directly or implicitly in the detailed description of various exemplary embodiments of the present disclosure. That is, various effects predicted according to various exemplary embodiments of the present disclosure will be included within a detailed description to be described later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
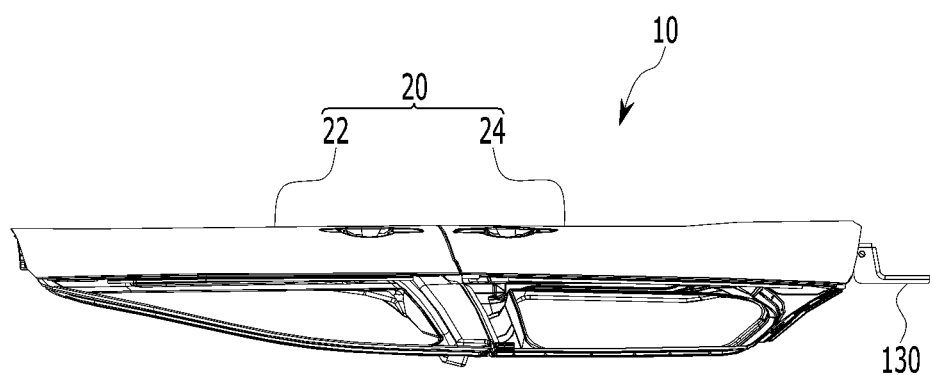
FIG. 1, FIG. 2, FIG. 3 and FIG. 4 are top plan view showing the operation of the vehicle body to which a door closing impact absorber apparatus and a door mechanism including the same according to various exemplary embodiments of the present disclosure may be applied.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown.

As those skilled in the art would realize, the described embodiments may be modified in various different ways, all without departing from the spirit or scope of the present disclosure.

To clearly explain an exemplary embodiment of the present disclosure, parts irrelevant to the description are omitted, and the same reference numerals are assigned to the same or similar elements throughout the specification.

To clearly explain an exemplary embodiment of the present disclosure, portions irrelevant to the description are omitted, and the same reference numerals are assigned to the same or similar elements throughout the specification.

In addition, in the detailed description below, the reason that the names of the components are divided into first, second, etc. is to classify the components in the same relationship, and it is not necessarily limited to the order in the following description.

Throughout the specification, when it is said that a certain part includes certain constituent elements, this means that other constituent elements may be further included, rather than excluding other constituent elements, unless specifically stated otherwise.

In addition, terms such as . . . part, . . . means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Various exemplary embodiments of the present disclosure will hereinafter be described in detail with reference to the accompanying drawings.

FIG. 1, FIG. 2, FIG. 3 and FIG. 4 is a top plan view showing the operation of the vehicle body to which a door closing impact absorber apparatus and a door mechanism including the same according to various exemplary embodiments of the present disclosure may be applied.

In FIG. 1, FIG. 2, FIG. 3 and FIG. 4, for convenience of understanding, although a door closing impact absorber apparatus and a door mechanism including the same according to various exemplary embodiments of the present disclosure has shown an example applied to the pillar-less vehicle body to which the coach door (or suicide door) is applied, but is not limited thereto, the door closing impact absorber apparatus and the door mechanism including the same according to various exemplary embodiments of the present disclosure may be also applied to the vehicle body with a pillar.

That is, the door closing impact absorber apparatus and the door mechanism including the same according to various exemplary embodiments of the present disclosure may be applied to a vehicle body including a pillar, and may also be applied to a vehicle body to which an opposing door or an opposing swing door is applied.

In FIG. 1, FIG. 2, FIG. 3 and FIG. 4, the vehicle body 10 to which a door closing impact absorber apparatus and a door mechanism including the same may be applied includes a door 20.

The door 20 may include a front door 22 in front of the vehicle and a rear door 24 in the rear of the vehicle.

For convenience of understanding, an exemplary embodiment of the door closing impact absorber apparatus and the door mechanism including the same according to an exemplary embodiment of the present disclosure is referred to as an example applied to the rear door 24, but is not limited thereto, an exemplary embodiment of the door mechanism including the same may also be applied to the front door.

Drawing reference number 130 is a door mounting bracket that mounts the rear door 24 to the vehicle body 10, and the rear door 24 may perform a swing operation or a sliding operation based on the door mounting bracket 130.

Figure 4:
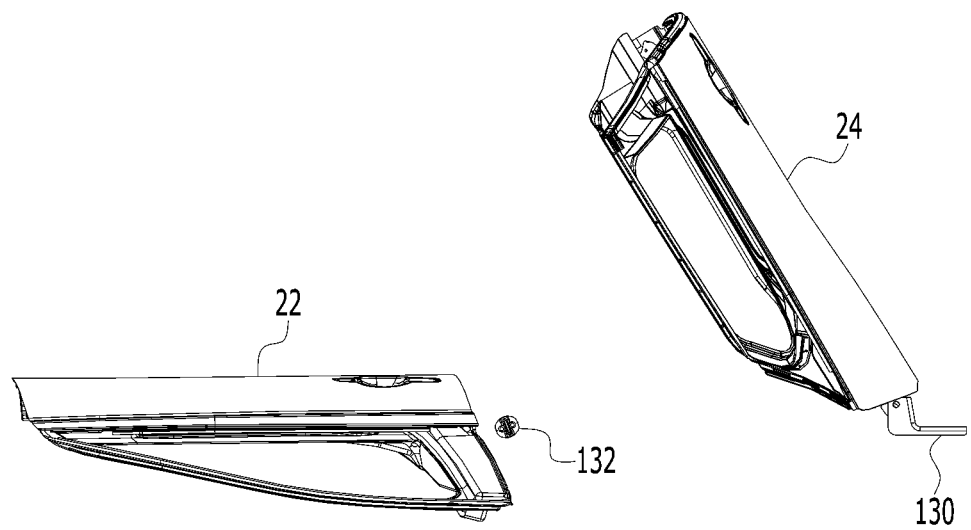

Reference numeral 132 shown in FIG. 4 is a guide striker, and when the rear door 24 performs a sliding operation, it is a configuration that guides the vehicle body length direction movement of the rear door 24.

Figure 2:
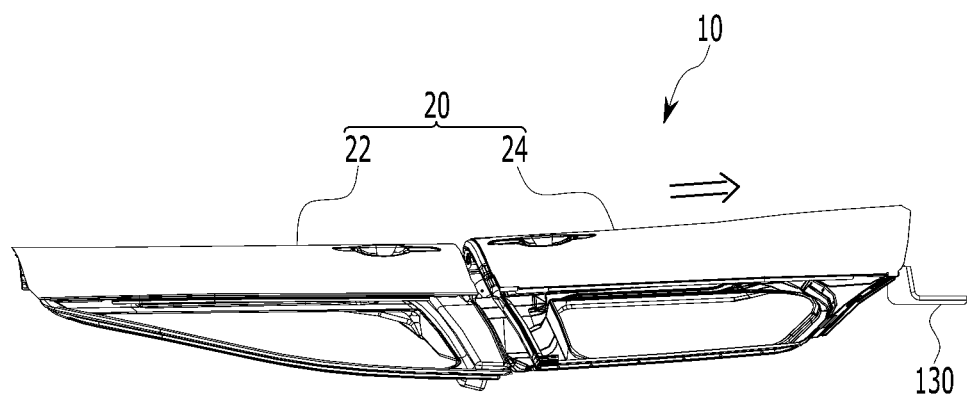
Figure 3:
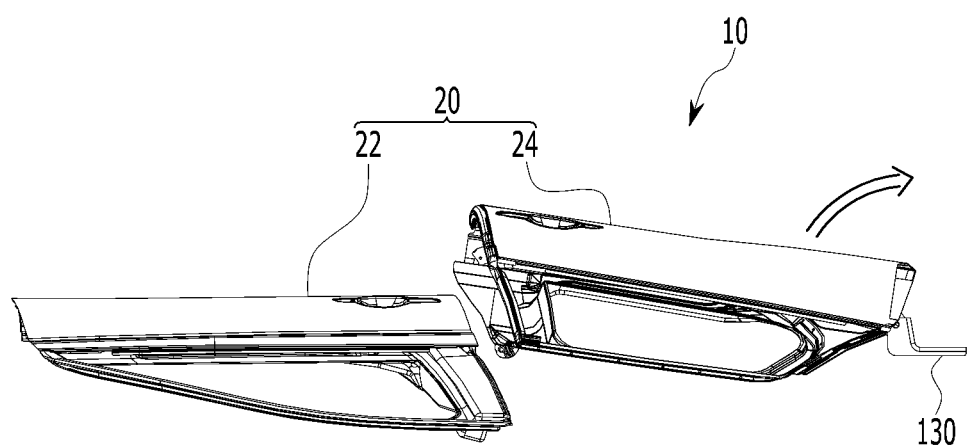

FIG. 1 shows the closed state of the rear door 24, FIG. 2 shows the sliding operation of the rear door 24, FIG. 3 shows the transition operation from the sliding operation of the rear door 24 to the swing operation, FIG. 4 shows the rear door 24 fully open state.

In the detailed description and claim of the present disclosure, the sliding operation refers to an operation in which the door 20 moves in the forward and backward direction of the vehicle body 10, and the swing operation refers to rotation of the door 20 around a rotation axis.

Figure 5:
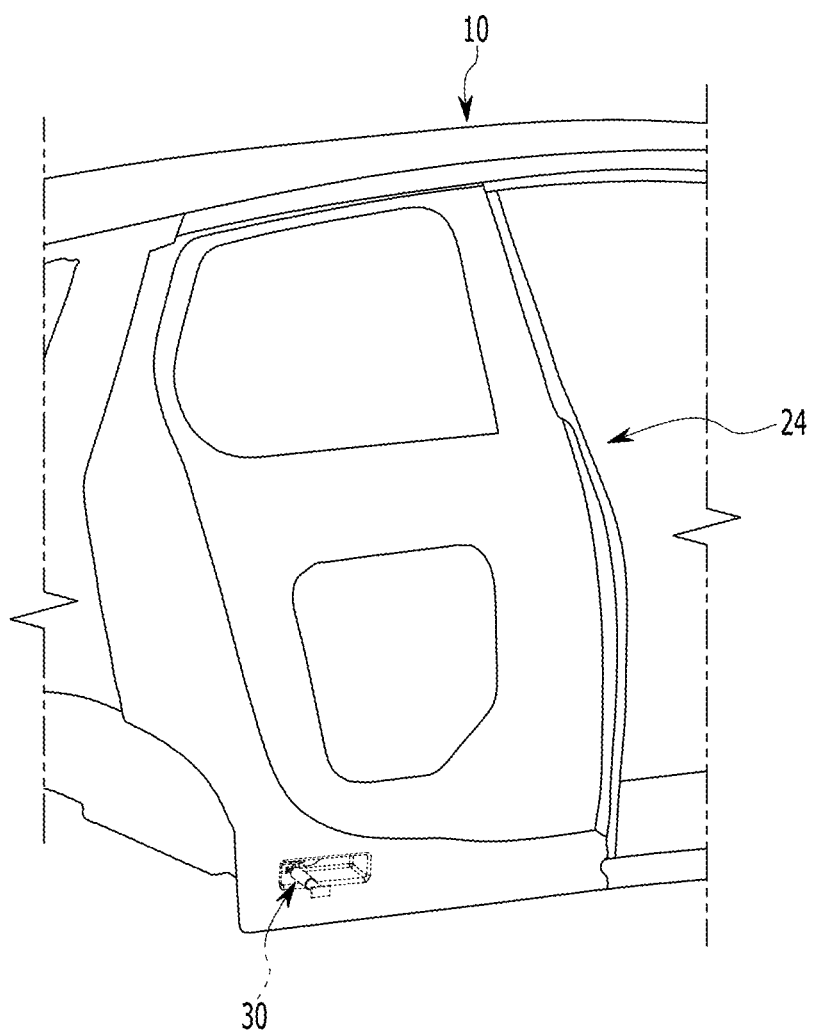
FIG. 5 is a side view of a vehicle body to which a door closing impact absorber apparatus and a door mechanism including a same according to various exemplary embodiments of the present disclosure may be applied.

FIG. 5 is a side view of a vehicle body to which a door closing impact absorber apparatus and a door mechanism including the same according to various exemplary embodiments of the present disclosure may be applied.

Referring to FIG. 5, the door closing impact absorber apparatus 30 according to various exemplary embodiments of the present disclosure may be mounted on the lower portion of the vehicle body 10.

That is, the door closing impact absorber apparatus 30 may be disposed between the rear door 24 and the vehicle body 10 in the vicinity of the door mounting bracket 130.

Figure 6:
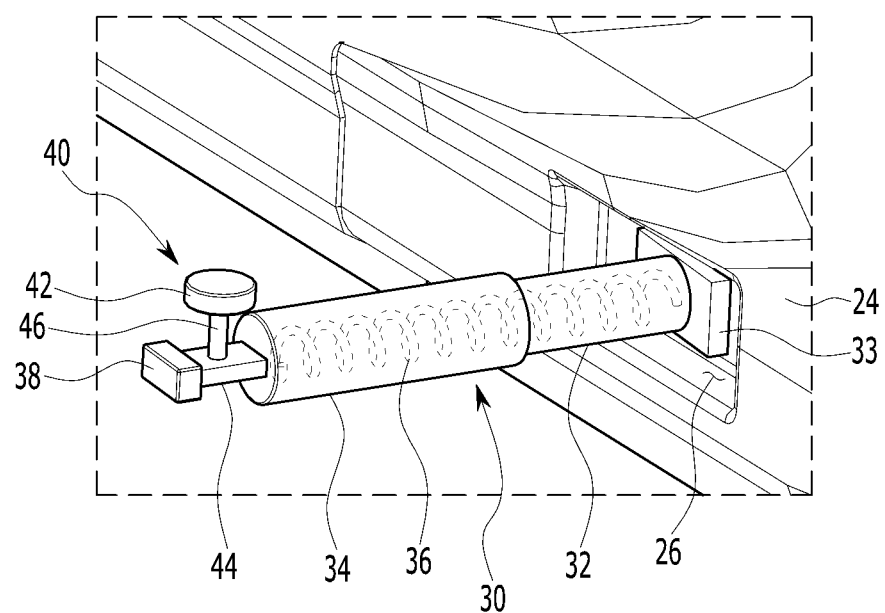
FIG. 6 is a drawing showing a state in which a door mechanism including a door closing impact absorber apparatus according to various exemplary embodiments of the present disclosure is mounted on a door.
Figure 7:
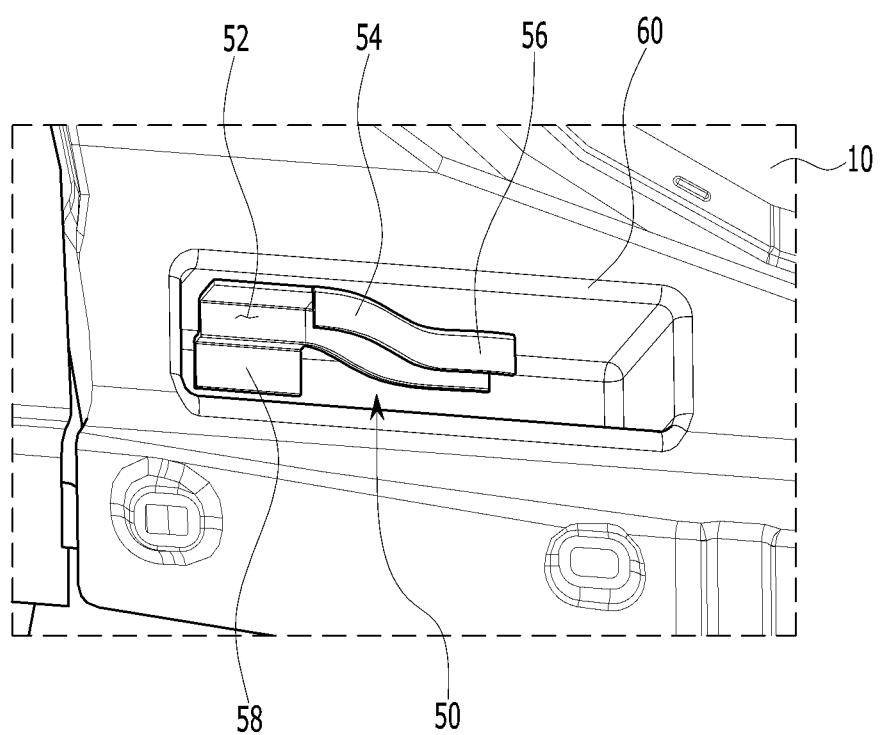
FIG. 7 is a drawing showing a guide rail which may be applied to a door mechanism including a door closing impact absorber apparatus according to various exemplary embodiments of the present disclosure.
Figure 8:
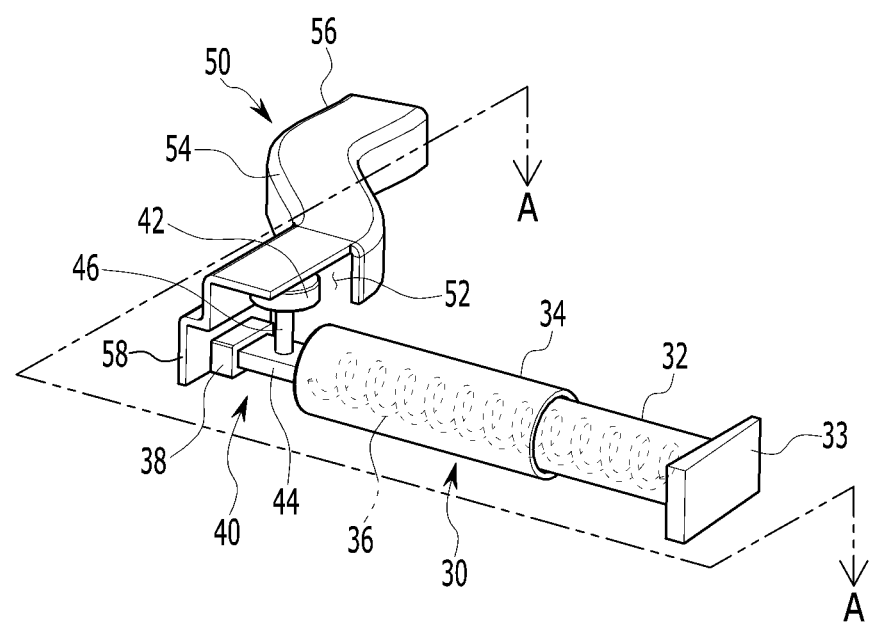
FIG. 8 is a partial perspective view of a door mechanism including a door closing impact absorber apparatus according to various exemplary embodiments of the present disclosure.

FIG. 6 is a drawing showing a state in which a door mechanism including a door closing impact absorber apparatus according to various exemplary embodiments of the present disclosure is mounted on a door, FIG. 7 is a drawing showing a guide rail which may be applied to a door mechanism including a door closing impact absorber apparatus according to various exemplary embodiments of the present disclosure, and FIG. 8 is a partial perspective view of a door mechanism including a door closing impact absorber apparatus according to various exemplary embodiments of the present disclosure.

FIG. 5 to referring to FIG. 8, the door closing impact absorber apparatus 30 according to various exemplary embodiments of the present disclosure may include a first body 32, a second body 34 connected to the first body 32 with relative movement in the longitudinal direction thereof, and an elastic portion 36 disposed between the first body 32 and the second body 34 to support elastically the first body 32 and the second body 34.

The elastic portion may be, for example, a compression spring, but is not limited thereto.

In the drawing, the first body 32 is inserted into the second body 34, and the elastic portion 36 is shown as provided on the inside of the second body 34, but is not limited thereto.

Furthermore, although the first body 32 and the second body 34 are illustrated as including a hollow pipe shape, the present disclosure is not limited thereto.

That is, the second body 34 may be inserted into the first body 32, and the first body 32 and the second body 34 may be configured in a polygonal column shape.

Furthermore, the elastic portion 36 may have a configuration provided on the outside of the second body 34.

That is, the first body 32 and the second body 34 of the door closing impact absorber apparatus 30 according to various exemplary embodiments of the present disclosure may be various configurations configured for relative movement (sliding) in the longitudinal direction thereof and the elastic portion 36 may be of various types of elasticity configuration to provide the longitudinal direction elastic force of the first body 32 and the second body 34.

The first body 32 may be mounted on the door 20.

In the drawing, it is shown that the door closing impact absorber apparatus 30 is mounted on the rear door 24, but is not limited thereto, as well as it is mounted on the front door 22 to reduce the impact when the front door 22 is closed.

A connection bracket 33 is provided between the first body 32 and the rear door 24 so that the first body 32 may be mounted on the rear door 24.

The connection bracket 33 may be mounted to a door connection portion 26 formed in the rear door 24.

The door closing impact absorber apparatus 30 according to various exemplary embodiments of the present disclosure may further include an impact absorber 38 mounted on one end portion of the second body 34.

The impact absorber 38 may be made of a variety of materials such as rubber, silicone, elasticity plastic, etc., which may mitigate the closing impact of the rear door 24 and the vehicle body 10 when the rear door 24 is closed.

The door closing impact absorber apparatus 30 according to various exemplary embodiments of the present disclosure may further include a guide portion 40 mounted on the second body 34.

The guide portion 40 may include a bearing 42.

A guide portion bracket 44 may be mounted on the second body 34 of the door closing impact absorber apparatus 30, and the bearing 42 may be mounted on the guide portion bracket 44 through a guide portion rod 46.

The door mechanism according to various exemplary embodiments of the present disclosure may include the door closing impact absorber apparatus 30 according to various exemplary embodiments of the present disclosure.

The door mechanism according to various exemplary embodiments of the present disclosure is mounted on the vehicle body 10, and may further include a guide rail 50 for guiding the movement of the guide portion 40.

Referring to FIG. 7, the guide rail 50 may include a rail gate portion 52 for the guide portion 40 is inserted or separated therethrough, a rail slope 54 for guiding the guide portion 40 in the vehicle body width direction and the vehicle body length direction of the vehicle body, and a sliding portion 56 for guiding the guide portion 40 in the vehicle body length direction.

The bearing 42 is rotatably mounted on the guide portion rod 46, and the bearing 42 guides the door closing impact absorber apparatus 30 to move relative to the guide rail 50.

The bearing 42 may be configured in various forms which may be moved along the guide rail 50, for example, various types of configurations such as sliding bearings and ball bearings.

The guide rail 50 may further include a contact portion 58 formed protrude to selectively contact with the impact absorber 38.

Figure 9:
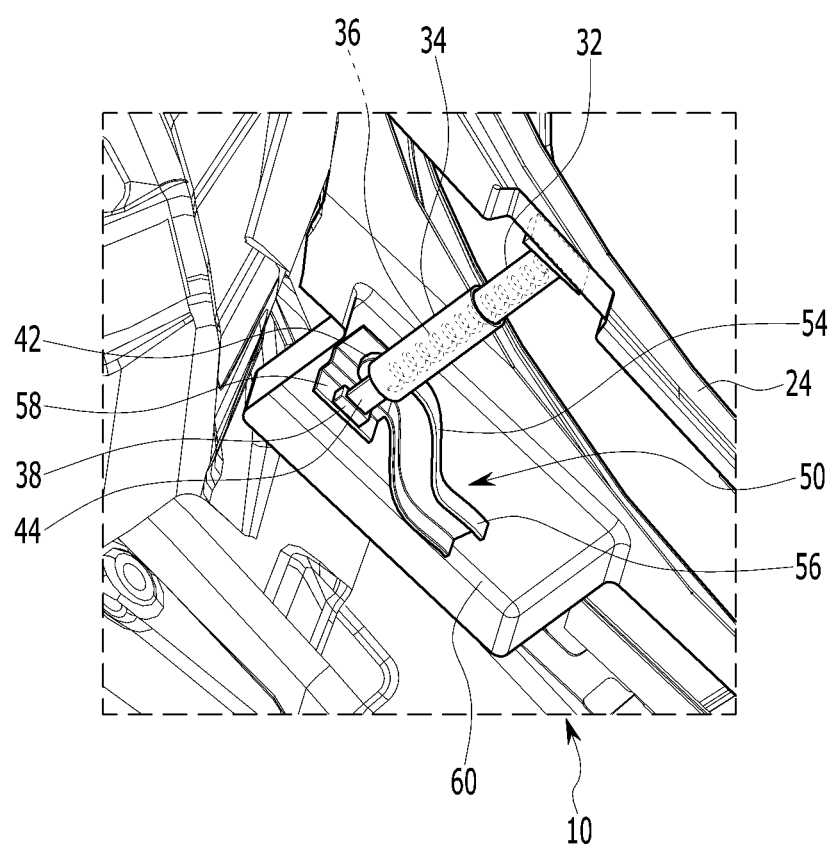
FIG. 9 and FIG. 10 are views showing an operation of a door mechanism including a door closing impact absorber apparatus according to various exemplary embodiments of the present disclosure as a cross-section perspective view along line A-A in FIG. 8.
Figure 10:
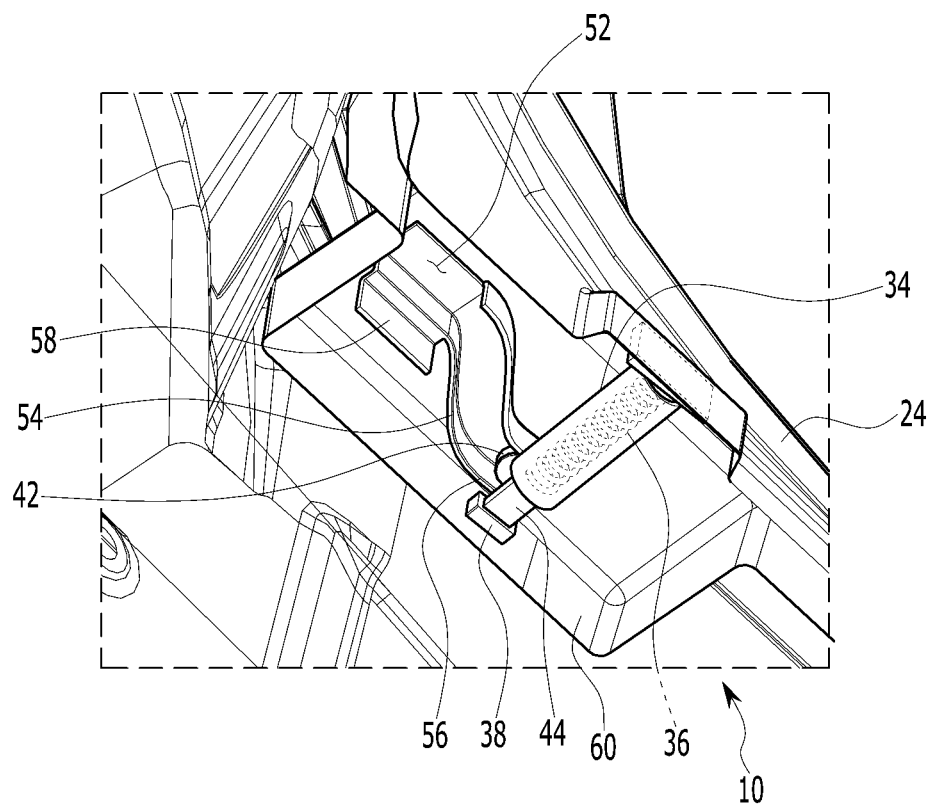

FIG. 9 and FIG. 10 are views showing an operation of a door mechanism including a door closing impact absorber apparatus according to various exemplary embodiments of the present disclosure as a cross-section perspective view along line A-A in FIG. 8.

As shown in FIG. 7, FIG. 9 and FIG. 10, the door mechanism according to various exemplary embodiments of the present disclosure may further include a guide rail bracket 60 for mounting the guide rail 50 to the vehicle body.

Hereinafter, referring to FIG. 1 to FIG. 10, the operation of the door mechanism according to various exemplary embodiments of the present disclosure will be described.

As described referring to FIG. 1, FIG. 2, FIG. 3 and FIG. 4, the rear door 24 may be opened through a sliding operation and a swing operation.

Conversely, when the rear door 24 is closed, it is closed through a swing operation and a sliding operation.

In the instant case, the panel of the rear door 24 and the weather strip of the vehicle body 10 may not completely match.

As a result, shaking of the rear door 24 may occur, and an impact between the rear door 24 and the vehicle body 10 may occur.

When the rear door 24 swings operation, the impact absorber 38 contacts with the contact portion 58 and the impact absorber 38 can absorb the door closing impact.

At the present time, the guide portion 40 is inserted through the rail gate portion 52 and may be relatively moved along the guide rail 50.

At same time, the entire length of the first body 32 and the second body 34 is reduced, and the elastic portion 36 disposed between the first body 32 and the second body 34 can absorb the door closing impact.

In the sliding operation shown In FIG. 2 and FIG. 1, the bearing 42 moves along the rail slope 54, and the rear door 24 moves forward of the vehicle body 10 and approaches the vehicle body 10.

Accordingly, the bearing 42 moves along the sliding portion 56, and the rear door 24 is closed.

Thereafter, when the vehicle occupant opens the rear door 24, the bearing 42 moves along the sliding portion 56 and the rail slope 54, and is separated from the rail gate portion 52.

At the present time, the entire length of the first body 32 and the second body 34 is increased by the elastic force of the elastic portion 36, and the opening operation of the rear door 24 is performed more smoothly.

As described above, according to the door closing impact absorber apparatus and the door mechanism including the same according to various exemplary embodiments of the present disclosure, it is possible to prevent the shaking of the door by absorbing the impact when the opposing door is closed.

Furthermore, according to the door closing impact absorber apparatus and the door mechanism including the same according to various exemplary embodiments of the present disclosure, it is possible to suppress the noise generation by absorbing the impact when the opposing door is closed, so that it is possible to improve the marketability.

In addition, according to the door closing impact absorber apparatus and the door mechanism including the same according to various exemplary embodiments of the present disclosure, when the door is opened, the door may be easily opened even if the vehicle occupant does not apply a large force.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door mechanism including a door closing impact absorber apparatus, wherein the door closing impact absorber apparatus comprises:
    a first body;
    a second body coupled to the first body, wherein the first body and the second body are relatively movable therebetween;
    an elastic portion disposed between the first body and the second body to support elastically the first body and the second body;
    a guide portion mounted on the second body;
    a guide rail for guiding movement of the guide portion; and
    an impact absorber surrounding one end portion of the second body and mounted thereto,
    wherein the first body is mounted on a door,
    wherein the guide rail includes:
        a rail gate portion for the guide portion to be inserted or separated therethrough;
        a rail slope including a predetermined slope for guiding the guide portion in a vehicle body width direction and a vehicle body length direction of a vehicle body; and
        a sliding portion for guiding the guide portion in the vehicle body length direction, and
    wherein the door is an opposing door or an opposing swing door.

2. The door mechanism of claim 1, wherein the guide portion includes a bearing.

3. The door mechanism of claim 2, wherein a guide portion bracket is mounted on the second body of the door closing impact absorber apparatus, and the bearing is mounted on the guide portion bracket through a guide portion rod.

4. The door mechanism of claim 3, wherein the impact absorber is mounted to an end of the guide portion bracket.

5. The door mechanism of claim 1, wherein the guide rail further includes a contact portion formed to protrude to selectively contact with the impact absorber.

6. The door mechanism of claim 1, further includes a guide rail bracket for mounting the guide rail to the vehicle body.

7. The door mechanism of claim 1, wherein the door is a rear door.

8. The door mechanism of claim 1, wherein the door closing impact absorber apparatus is mounted on a lower portion of the door.

* * * * *